(12) United States Patent
Wang et al.

(10) Patent No.: US 10,728,229 B2
(45) Date of Patent: Jul. 28, 2020

(54) METHOD AND DEVICE FOR COMMUNICATING SECURELY BETWEEN T-BOX DEVICE AND ECU DEVICE IN INTERNET OF VEHICLES SYSTEM

(71) Applicant: BEIJING BAIDU NETCOM SCIENCE AND TECHNOLOGY CO., LTD., Beijing (CN)

(72) Inventors: Mingwei Wang, Beijing (CN); Shaohua Zhang, Beijing (CN); Peng Yun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 278 days.

(21) Appl. No.: 15/879,068

(22) Filed: Jan. 24, 2018

(65) Prior Publication Data
US 2018/0212937 A1     Jul. 26, 2018

(30) Foreign Application Priority Data
Jan. 25, 2017 (CN) .......................... 2017 1 0061175

(51) Int. Cl.
*H04L 9/32* (2006.01)
*H04L 29/06* (2006.01)
(Continued)

(52) U.S. Cl.
CPC .......... *H04L 63/0442* (2013.01); *G06F 21/44* (2013.01); *G06F 21/629* (2013.01);
(Continued)

(58) Field of Classification Search
CPC combination set(s) only.
See application file for complete search history.

(56) References Cited

U.S. PATENT DOCUMENTS 9,984,561 B1 *  5/2018  Swafford ............... G08C 17/02
2003/0147534 A1 *  8/2003  Ablay ................... H04L 9/3271
                                                                380/270
(Continued)

OTHER PUBLICATIONS

"Chen Shen, Hao Li, Gokhan Sahin, Hyeong-Ah Choi, Low-complexity Scalable Authentication algorithm with Imperfect Shared Keys for Internet of Things, May 23-27, 2016, IEEE Xplore, INSPEC # 16138595" (Year: 2016).*

(Continued)

*Primary Examiner* — Phy Anh T Vu
(74) *Attorney, Agent, or Firm* — Marshall, Gerstein & Borun LLP

(57) ABSTRACT

The objective of the present disclosure is to provide a method and device for communicating securely between a T-Box device and an ECU device in an Internet of Vehicles system. Specifically, sending, by a T-Box device, a first piece of information to a corresponding ECU device; generating, by the ECU device, a second piece of information; generating, by the T-Box device, a third piece of information; generating, by the T-Box device, a first key; encrypting, by the T-Box device, a to-be-issued instruction based on the first key; generating, by the ECU device, a second key; and decrypting, by the ECU device, the encrypted instruction based on the second key to obtain the instruction. Compared with the prior art, the present disclosure achieves the secure communication between the T-Box device and the ECU device.

19 Claims, 2 Drawing Sheets

(51) Int. Cl.
*H04L 9/08* (2006.01)
*G06F 21/64* (2013.01)
*H04L 9/06* (2006.01)
*H04L 12/40* (2006.01)
*G06F 21/44* (2013.01)
*G06F 21/62* (2013.01)

(52) U.S. Cl.
CPC ............ G06F 21/64 (2013.01); H04L 9/0643 (2013.01); H04L 9/0838 (2013.01); H04L 9/0866 (2013.01); H04L 9/0869 (2013.01); H04L 9/3297 (2013.01); H04L 12/40 (2013.01); H04L 12/40104 (2013.01); *H04L 2012/40215* (2013.01); *H04L 2012/40273* (2013.01); *H04L 2209/84* (2013.01)

(56) References Cited

U.S. PATENT DOCUMENTS

| | | | | |
|---|---|---|---|---|
| 2005/0177714 | A1* | 8/2005 | Jeong | G06F 21/445 713/155 |
| 2006/0033615 | A1* | 2/2006 | Nou | G08B 13/19647 340/539.13 |
| 2006/0143132 | A1* | 6/2006 | Valenti | G06F 21/10 705/57 |
| 2006/0143453 | A1* | 6/2006 | Imamoto | H04L 9/3273 713/169 |
| 2009/0034631 | A1* | 2/2009 | Cho | H04N 5/44 375/240.27 |
| 2009/0323967 | A1* | 12/2009 | Peirce | H04L 9/0869 380/278 |
| 2012/0295592 | A1* | 11/2012 | Peirce | H04L 67/125 455/414.1 |
| 2013/0129093 | A1* | 5/2013 | Patel | H04L 63/061 380/270 |
| 2013/0311781 | A1* | 11/2013 | Wang | H04L 9/3247 713/176 |
| 2013/0339744 | A1* | 12/2013 | Nagai | H04L 63/061 713/182 |
| 2014/0079217 | A1* | 3/2014 | Bai | H04L 63/0869 380/270 |
| 2016/0174073 | A1* | 6/2016 | Yu | H04W 12/06 455/411 |
| 2017/0236342 | A1* | 8/2017 | Mattsson | G06Q 10/10 701/32.5 |
| 2017/0236343 | A1* | 8/2017 | Leboeuf | H04W 12/06 340/5.61 |
| 2017/0257345 | A1* | 9/2017 | Westra | H04L 63/029 |
| 2017/0366521 | A1* | 12/2017 | Lei | H04L 63/0492 |
| 2018/0279119 | A1* | 9/2018 | Eftimovski | H04W 12/02 |

OTHER PUBLICATIONS

"Hargun andhu, Dietmar P.F. Moller, Mobile Applicaitons and Secure Vehicular Integration, May 3-5, 2018, IEEE Xplore, INSPEC #18183526" (Year: 2018).*

* cited by examiner

METHOD AND DEVICE FOR COMMUNICATING SECURELY BETWEEN T-BOX DEVICE AND ECU DEVICE IN INTERNET OF VEHICLES SYSTEM

CROSS-REFERENCE TO RELATED APPLICATIONS

This application is related to and claims priority from Chinese patent application no. 201710061175.7, filed with the State Intellectual Property Office of the People's Republic of China (SIPO) on Jan. 25, 2017, the entire disclosure of the Chinese application is hereby incorporated by reference.

TECHNICAL FIELD

The present disclosure relates to the field of Internet of Vehicles (IoV) technology, specifically relates to a technology for communicating securely between a T-Box device and an ECU device in an Internet of Vehicles system.

BACKGROUND

With the diversification, networking and intelligentization of Internet of Vehicles applications, the security offence surface of the Internet of Vehicles is being increasingly threatened. An important core component in the Internet of Vehicles is the T-Box (Telematics Box) control unit, which may be used to exchange the data information between the in-vehicle ECU (Electronic Control Unit) and the exterior of the vehicle. However, at present, the communication between the T-Box and the ECU is still transmitted on a CAN (Controller Area Network) bus in plaintext. The CAN bus communication technology does not consider the information security feature, and the transmission and reception of data packets are performed without authentication and data encryption.

Existing secure communication technologies such as SSL (Secure Socket Layer), IPSec (Internet Protocol Security) and S-HTTP (Secure Hypertext Transfer Protocol) generally use a symmetric or an asymmetric algorithm to encrypt data and use authentication techniques to perform a unidirectional or a bidirectional authentication on both communication entities. However, the existing bidirectional authentication solution not only has many interactive processes, but also uses a complex encryption algorithm, while the T-Box device and the ECU device in the Internet of Vehicles are both resource-intensive embedded system devices, causing much difficulty in applying the existing security technical solutions to the certification and communication of the T-Box and the ECU.

How to implement a secure communication between the T-Box and the vehicle ECU has become an urgent technical problem to be solved, when faced with the risk that hackers may remotely control the T-Box, and attack by intercepting the communication content between the T-Box and the vehicle ECU.

SUMMARY

The objective of the present disclosure is to provide a method and device for communicating securely between a T-Box device and an ECU device in an Internet of Vehicles system.

According to an aspect of the present disclosure, a method for communicating securely between a T-Box device and an ECU device in an Internet of Vehicles system is provided, the method comprising:

sending, by a T-Box device, a first piece of information to a corresponding ECU device, the first piece of information being obtained by XORing a first random number generated by the T-Box device with a hash value of a master key of the Internet of vehicles system;

generating, by the ECU device, a second piece of information according to the first piece of information, the hash value of the master key, and a second random number generated by the ECU device, and sending the second piece of information to the T-Box device;

generating, by the T-Box device, a third piece of information according to the second piece of information, the first random number, and a third random number generated by the T-Box device, and sending the third piece of information to the ECU device;

generating, by the T-Box device, a first key according to the second piece of information and the third random number, and identity information of the T-Box device and an identity of the ECU device;

encrypting, by the T-Box device, a to-be-issued instruction based on the first key to send the encrypted instruction to the ECU device;

generating, by the ECU device, a second key, according to the third piece of information and the second random number, and the identity information of the T-Box device and the identity of the ECU device, in response to receiving the encrypted instruction sent by the T-Box device; and decrypting, by the ECU device, the encrypted instruction based on the second key to obtain the instruction.

According to another aspect of the present disclosure, a T-Box device for communicating securely with an ECU device in an Internet of Vehicles system is also provided, the T-Box device comprising:

an apparatus configured for sending a first piece of information to a corresponding ECU device, the first piece of information being obtained by XORing a first random number generated by the T-Box device with a hash value of a master key of the Internet of Vehicles system;

an apparatus configured for receiving a second piece of information sent by the ECU device, the second piece of information being generated according to the first piece of information, the hash value of the master key, and a second random number generated by the ECU device;

an apparatus configured for generating a third piece of information according to the second piece of information, the first random number, and a third random number generated by the T-Box device, and sending the third piece of information to the ECU device;

an apparatus configured for generating a first key according to the second piece of information and the third random number, and identity information of the T-Box device and an identity of the ECU device; and an apparatus configured for encrypting a to-be-issued instruction based on the first key to send the encrypted instruction to the ECU device.

According to a further aspect of the present disclosure, an ECU device for communicating securely with a T-Box device in an Internet of Vehicles system is further provided, the ECU device comprising:

an apparatus configured for receiving a first piece of information sent by a corresponding T-Box device, the first piece of information being obtained by XORing a first random number generated by the T-Box device with a hash value of a master key of the Internet of Vehicles system;

an apparatus configured for generating a second piece of information according to the first piece of information, the hash value of the master key, and a second random number generated by the ECU device, and sending the second piece of information to the T-Box device;

an apparatus configured for receiving a third piece of information sent by the T-Box device;

an apparatus configured for receiving encrypted instruction sent by the T-Box device, the instruction being encrypted by a first key, and the generation of the first key being based on the second piece of information, a third random number generated by the T-Box device, and identity information of the T-Box device and an identity of the ECU device;

an apparatus configured for generating a second key according to the third piece of information and the second random number, and the identity information of the T-Box device and the identity of the ECU device, in response to receiving the encrypted instruction; and an apparatus configured for decrypting the encrypted instruction based on the second key to obtain the instruction.

According to yet another aspect of the present disclosure, an Internet of Vehicles system is further provided, the system comprising a T-Box device according to another aspect of the present disclosure, and an ECU device according to a further aspect of the present disclosure.

Compared with the prior art, the T-Box device in an embodiment of the present disclosure can use the negotiated security session key to perform lightweight, secure communication with the ECU device, which solves the threat in the development of the present Internet of Vehicles that the user control command is eavesdropped, intercepted, forged and replayed in the "last kilometer," also enables the bidirectional authentication between the T-Box device and the ECU device, and further reduces the risk that either device is maliciously captured and thus sends unlawful data, such as an illegal ECU node sending unreasonable vehicle status information to the user, the captured T-Box device being maliciously replaced and used to execute the hacker's instructions in the in-vehicle network.

BRIEF DESCRIPTION OF THE DRAWINGS

After reading detailed descriptions of non-limiting embodiments with reference to the following accompanying drawings, other features, objectives and advantages of the present disclosure will be more apparent.

The same or similar reference numbers in the drawings represent the same or similar components.

DETAILED DESCRIPTION OF EMBODIMENTS

The present disclosure will be further described in detail below with reference to the accompanying drawings.

Figure 1:
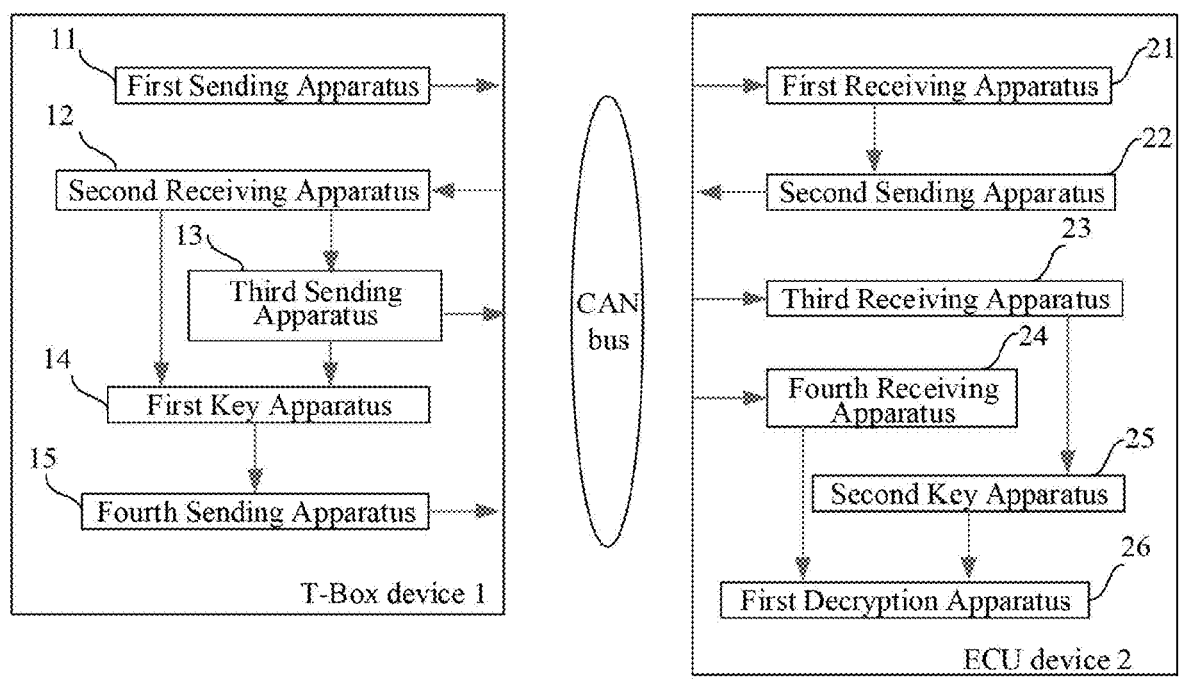
FIG. 1 shows a device schematic diagram of a T-Box device and an ECU device in an Internet of Vehicles system according to an aspect of the present disclosure.

FIG. 1 shows a T-Box device 1 and an ECU device 2 in an Internet of Vehicles system according to an aspect of the present disclosure, and a secure communication between the T-Box device 1 and the ECU device 2 can be implemented.

Here, the T-Box device 1 includes: an apparatus configured for sending a first piece of information to the corresponding ECU device 2 (hereinafter referred to as the "first sending apparatus 11"), wherein the first piece of information is obtained by XORing a first random number generated by the T-Box device 1 with a hash value of a master key of the Internet of Vehicles system; an apparatus configured for receiving a second piece of information sent by the ECU device 2 (hereinafter referred to as the "second receiving apparatus 12"), wherein the second piece of information is generated according to the first piece of information, the hash value of the master key, and a second random number generated by the ECU device 2; an apparatus configured for generating a third piece of information (hereinafter referred to as the "third sending apparatus 13") according to the second piece of information, the first random number, and a third random number generated by the T-Box device 1, and sending the third piece of information to the ECU device 2; an apparatus configured for generating a first key (hereinafter referred to as the "first key apparatus 14") according to the second piece of information and the third random number, and identity information of the T-Box device 1 and an identity of the ECU device 2; an apparatus configured for encrypting a to-be-issued instruction (hereinafter referred to as the "fourth sending apparatus 15") based on the first key to send the encrypted instruction to the ECU device 2. The ECU device 2 includes: an apparatus configured for receiving a first piece of information sent by the corresponding T-Box device 1 (hereinafter referred to as the "first receiving apparatus 21"), wherein the first piece of information is obtained by XORing a first random number generated by the T-Box device 1 with a hash value of a master key of the Internet of Vehicles system; an apparatus configured for generating a second piece of information (hereinafter referred to as the "second sending apparatus 22") according to the first piece of information, the hash value of the master key, and a second random number generated by the ECU device 2, and sending the second piece of information to the T-Box device 1; an apparatus configured for receiving a third piece of information sent by the T-Box device 1 (hereinafter referred to as the "third receiving apparatus 23"); an apparatus configured for receiving encrypted instruction sent by the T-Box device 1 (hereinafter referred to as the "fourth receiving apparatus 24"), wherein the instruction is encrypted by a first key, and the generation of the first key is based on the second piece of information, a third random number generated by the T-Box device 1, and identity information of the T-Box device 1 and an identity of the ECU device 2; an apparatus configured for generating a second key (hereinafter referred to as the "second key apparatus 25") according to the third piece of information and the second random number, and the identity information of the T-Box device 1 and the identity of the ECU device 2, in response to receiving the encrypted instruction; and an apparatus configured for decrypting the encrypted instruction (hereinafter referred to as the "first decryption apparatus 26") based on the second key to obtain the instruction.

Specifically, the first sending apparatus 11 of the T-Box device 1 sends the first piece of information to the corresponding ECU device 2, wherein the first piece of information is obtained by XORing the first random number generated by the T-Box device 1 with the hash value of the master key of the Internet of Vehicles system; correspondingly, the first receiving apparatus 21 of the ECU device 2 receives the first piece of information sent by the corresponding T-Box device 1, wherein the first piece of information is obtained by XORing the first random number generated by the T-Box device 1 with the hash value of the master key of the Internet of Vehicles system; the second sending apparatus 22 generates the second piece of information according to the first piece of information, the hash value of the master key, and the second random number generated by the ECU device 2, and sends the second piece of information to the T-Box device 1; correspondingly, the second receiving apparatus 12 of the T-Box device 1 receives the second piece of information sent by the ECU device 2, wherein the second piece of information is generated according to the first piece of information, the hash value of the master key, and the second random number generated by the ECU device 2; the third sending apparatus 13 generates the third piece of information according to the second piece of information, the first random number, and the third random number generated by the T-Box device 1, and sends the third piece of information to the ECU device 2; correspondingly, the third receiving apparatus 23 of the ECU device 2 receives the third piece of information sent by the T-Box device 1; the first key apparatus 14 of the T-Box device 1 generates the first key according to the second piece of information and the third random number, and the identity information of the T-Box device 1 and the identity of the ECU device 2; the fourth sending apparatus 15 encrypts the to-be-issued instruction based on the first key to send the encrypted instruction to the ECU device 2; correspondingly, the fourth receiving apparatus 24 of the ECU device 2 receives the encrypted instruction sent by the T-Box device 1, wherein the instruction is encrypted by the first key, and the generation of the first key is based on the second piece of information, the third random number generated by the T-Box device 1, and the identity information of the T-Box device 1 and the identity of the ECU device 2; the second key apparatus 25 generates the second key according to the third piece of information and the second random number, and the identity information of the T-Box device 1 and the identity of the ECU device 2, in response to receiving the encrypted instruction; and the first decryption apparatus 26 decrypts the encrypted instruction based on the second key to obtain the instruction.

Here, the T-Box device 1 refers to a vehicle-mounted information terminal in the vehicle mainly used for communicating with a backend system/mobile phone APP to implement the display and control of information of the vehicle on the mobile phone APP. For example, the management to the operation data and position data of the vehicle is implemented, functions such as real-time monitoring (maps, charts), data playback, track playback, remote diagnosis are provided, and the data information between the in-vehicle ECU and the exterior of the vehicle can be exchanged.

Here, the ECU device 2 refers to a dedicated microcomputer controller of the vehicle and is generally composed of a microprocessor (CPU), a memory (ROM, RAM), an input/output interface (I/O), an analog/digital converter (A/D) and large-scale integrated circuits such as those for shaping and driving, which may be referred to as a "driving computer," a "vehicle-mounted computer" and so on.

Here, before the vehicle leaves the factory, the T-Box device 1 and the ECU device 2 may be pre-assigned identity information, including the identity ID of the T-Box device 1 (e.g., the T_BOX_ID), the identity ID of the ECU devices 2 (e.g., the ECU-i), and the master key for the network communication between the T-Box device 1 and the ECU device 2. In a specific embodiment, the T-Box device 1 and the ECU device 2 may communicate using a CAN bus. Here, the master key refers to a key shared between the T-Box device 1 and the ECU device 2, which may be used as an initial auxiliary key for generating a session key between the T-Box device 1 and the ECU device 2, and the master key can be synchronized within a certain period.

Those skilled in the art should understand that the above-mentioned T-Box device 1 and the ECU device 2 are only examples, and other T-Box devices or ECU devices that exists or may appear in the future should also be included in the protection scope of the present disclosure, if applicable to the present disclosure, and hereby incorporated by reference herein. Here, each of the T-Box device 1 and the ECU device 2 includes an electronic device capable of automatically performing numerical calculation and information processing according to instructions preset or stored in advance. The hardware includes, but is not limited to, a microprocessor, a dedicated integrated circuit (ASIC), a field programmable gate array (FPGA), a digital signal processor (DSP), an embedded device, and the like.

Specifically, the first sending apparatus 11 of the T-Box device 1 sends the first piece of information to the corresponding ECU device 2, wherein the first piece of information is obtained by XORing the first random number generated by the T-Box device 1 with the hash value of the master key of the Internet of Vehicles system.

For example, the T-Box device 1 and the ECU device 2 of a newly minted vehicle are pre-assigned identity information, for example, the identity ID of the T-Box device 1 is T_BOX_ID, the identity of the ECU devices 2 is ECU-i, and the master key for the network communication between the T-Box device 1 and the ECU device 2 is a. When the T-Box device 1 communicates with the ECU device 2, the first sending apparatus 11 of the T-Box device 1 first generates the first random number such as nounce_1, and then XORs the first random number with the hash value of the master key a to obtain the first piece of information, that is, if the first piece of information is denoted by N_1, N_1=nounce_1⊕hash(a). Then, the first sending apparatus 11 sends the first piece of information to the corresponding ECU device 2 via the CAN bus.

Correspondingly, the first receiving apparatus 21 of the ECU device 2 receives the first piece of information sent by the corresponding T-Box device 1 via the CAN bus, wherein the first piece of information is obtained by XORing the first random number generated by the T-Box device 1 with the hash value of the master key of the Internet of Vehicles system. For example, following the above example, the first piece of information received by the first receiving apparatus 21 of the ECU device 2 is N_1.

The second sending apparatus 22 generates the second piece of information according to the first piece of information, the hash value of the master key, and the second random number generated by the ECU device 2, and sends the second piece of information to the T-Box device 1.

For example, following the above example, the second sending apparatus 22 first generates the second random number such as nounce_2; then, XORs the first piece of information N_1 with the hash value hash(a) of the master key to obtain nounce_1_cal, and XORs the XORed value nounce_1_cal with the second random number nounce_2 to obtain the second piece of information, that is, if the second piece of information is denoted by N_2, N_2=nounce_2⊕nounce_1_cal=nounce_2⊕[N_1⊕hash(a)]. Then, the second sending apparatus 22 sends the second piece of information to the T-Box device 1 via the CAN bus.

Correspondingly, the second receiving apparatus 12 of the T-Box device 1 receives the second piece of information sent by the ECU device 2, wherein the second piece of information is generated according to the first piece of information, the hash value of the master key, and the second random number generated by the ECU device 2. For example, the second receiving apparatus 12 of the T-Box device 1 receives the second piece of information N_2 sent by the ECU device 2 via the CAN bus.

The third sending apparatus 13 generates the third piece of information according to the second piece of information, the first random number, and the third random number generated by the T-Box device 1, and sends the third piece of information to the ECU device 2.

For example, the third sending apparatus 13 calculates an XORed value of the second piece of information N_2 and the first random number nounce_1 to obtain nounce_2_cal, and XORs nounce_2_cal with the generated third random number nounce_3 to obtain the third piece of information N_3, that is, N_3=nounce_3⊕nounce_2_cal=nounce_3⊕[N_2 nounce_1]. Then, the third sending apparatus 13 sends the third piece of information to the ECU device 2 via the CAN bus.

Correspondingly, the third receiving apparatus 23 of the ECU device 2 receives the third piece of information N_3 sent by the T-Box device 1 via the CAN bus.

The first key apparatus 14 of the T-Box device 1 generates the first key according to the second piece of information and the third random number, and the identity information of the T-Box device 1 and the identity of the ECU device 2. For example, the first key apparatus 14 first data-splices the identity information of the T-Box device 1 T_BOX_ID, the identity of the ECU device 2 that is currently in communicating with the T-Box device 1 ECU-i, the third random number nounce_3, and the nounce_2_cal by data splicing to obtain: |T_BOX_ID|ECU-i|nounce_3|nounce_2_cal|. Then, a hash operation is performed on the result of the splicing by using the hash algorithm MD5 to obtain the first key key_1.

The fourth sending apparatus 15 encrypts the to-be-issued instruction based on the first key to send the encrypted instruction to the ECU device 2. For example, assuming that the to-be-issued instruction is Instruction-1, the fourth sending apparatus 15 first encrypts the instruction using key_1 to obtain the encrypted instruction key_1 Instruction-1; then, sends the encrypted instruction key_1_Instruction-1 to the ECU device 2 via the CAN bus.

Correspondingly, the fourth receiving apparatus 24 of the ECU device 2 receives the encrypted instruction sent by the T-Box device 1 via the CAN bus, wherein the instruction is encrypted by the first key, and the generation of the first key is based on the second piece of information, the third random number generated by the T-Box device 1, and the identity information of the T-Box device 1 and the identity of the ECU device 2.

The second key apparatus 25 generates the second key according to the third piece of information and the second random number, and the identity information of the T-Box device 1 and the identity of the ECU device 2, in response to receiving the encrypted instruction. For example, after the fourth receiving apparatus 24 receives the encrypted instruction key_1_Instruction-1 from the T-Box device 1, the second key apparatus 25 first data-splices the identity information of the T-Box device 1 that is currently in communicating with the ECU device 2 T_BOX_ID, the identity of the ECU device 2 ECU-i, the XORed value of the third piece of information and the second random number nounce_3_cal=N_3⊕nounce_2, and the second random number nounce_2 by data splicing to obtain: |T_BOX_ID|ECU-i|nounce_3_cal|nounce_2|; then, performs a hash operation on the result of the splicing by using the hash algorithm MD5 to obtain the second key key_2.

The first decryption apparatus 26 decrypts the encrypted instruction based on the second key to obtain the instruction. For example, the first decryption apparatus 26 decrypts the encrypted instruction key_1_Instruction-1 by using key_2 to obtain the corresponding instruction.

Here, the T-Box device in the present disclosure is capable of performing lightweight, secure communication with the ECU device using the negotiated secure session key. Specifically, the key negotiation parameter uses fixed parameters of the T-Box and the ECU themselves, random numbers generated by the T-Box and the ECU themselves to obtain a final, uniformed negotiation parameter through three interaction calculations, and then uses the secure hash function to act on the final negotiation parameter. In this process, the bidirectional authentication of the identity and the generation of the session key are completed. Finally, the session key is used to complete the subsequent data communication process.

Here, the T-Box device in the present disclosure is capable of performing lightweight, secure communication with the ECU device using the negotiated secure session key, which solves the threat in the development of the present Internet of Vehicles that the user control command is eavesdropped, intercepted, forged and replayed in the "last kilometer," also enables the bidirectional authentication between the T-Box device and the ECU device, and further reduces the risk that either device is maliciously captured and thus sends unlawful data, such as an illegal ECU node sending unreasonable vehicle status information to the user, the captured T-Box device being maliciously replaced and used to execute hacker instructions to the in-vehicle network.

The operation between the various apparatuses of the T-Box device 1 and the ECU device 2 is continuous. Specifically, the first sending apparatus 11 of the T-Box device 1 continuously sends the first piece of information to the corresponding ECU device 2, wherein the first piece of information is obtained by XORing the first random number generated by the T-Box device 1 with the hash value of the master key of the Internet of Vehicles system; correspondingly, the first receiving apparatus 21 of the ECU device 2 continuously receives the first piece of information sent by the corresponding T-Box device 1, wherein the first piece of information is obtained by XORing the first random number generated by the T-Box device 1 with the hash value of the master key of the Internet of Vehicles system; the second sending apparatus 22 continuously generates the second piece of information according to the first piece of information, the hash value of the master key, and the second random number generated by the ECU device 2, and sends the second piece of information to the T-Box device 1; correspondingly, the second receiving apparatus 12 of the T-Box device 1 continuously receives the second piece of information sent by the ECU device 2, wherein the second piece of information is generated according to the first piece of information, the hash value of the master key, and the second random number generated by the ECU device 2; the third sending apparatus 13 continuously generates the third piece of information according to the second piece of information, the first random number, and the third random number generated by the T-Box device 1, and sends the third piece of information to the ECU device 2; correspondingly, the third receiving apparatus 23 of the ECU device 2 continuously receives the third piece of information sent by the T-Box device 1; the first key apparatus 14 of the T-Box device 1 continuously generates the first key according to the second piece of information and the third random number, and the identity information of the T-Box device 1 and the identity of the ECU device 2; the fourth sending apparatus 15 continuously encrypts the to-be-issued instruction based on the first key to send the encrypted instruction to the ECU device 2; correspondingly, the fourth receiving apparatus 24 of the ECU device 2 continuously receives the encrypted instruction sent by the T-Box device 1, wherein the instruction is encrypted by the first key, and the generation of the first key is based on the second piece of information, the third random number generated by the T-Box device 1, and the identity information of the T-Box device 1 and the identity of the ECU device 2; the second key apparatus 25 continuously generates the second key according to the third piece of information and the second random number, and the identity information of the T-Box device 1 and the identity of the ECU device 2, in response to receiving the encrypted instruction; and the first decryption apparatus 26 continuously decrypts the encrypted instruction based on the second key to obtain the instruction. Here, it should be understood by those skilled in the art that the "continuously" means that the generation and sending of the first piece of information, the generation and sending of the second piece of information, the generation and sending of the third piece of information, the generation of the first key, the sending of the instruction encrypted by the first key, the generation of the second key, and the decryption of the instruction are continuously performed between the apparatuses of the T-Box device 1 and the ECU device 2, respectively, until the T-Box device 1 stops generating the first piece of information for a relatively long time.

In an embodiment, the T-Box device 1 further includes an apparatus configured for updating the master key (hereinafter referred to as the "update apparatus," not shown).

For example, the update apparatus may update the master key based on the received, user-initiated master key update instruction, or automatically update the master key in a periodic manner or the like.

In a specific embodiment, the update apparatus may further issue the updated master key to the ECU device 2, and the process of issuing may be completed according to the process of issuing the instruction between the T-Box device 1 and the ECU device 2. If the update is successfully completed, the original master key is deleted, and then the new master key is used in communication; if the update fails, the master key is not updated, and the user is notified of the failure.

In an embodiment (referring to FIG. 1), the T-Box device 1 further includes an apparatus configured for sending a first piece of auxiliary information and a second piece of auxiliary information to the ECU device 2 (hereinafter referred to as the "fifth sending apparatus," not shown). The ECU device 2 further includes: an apparatus configured for receiving the first piece of auxiliary information and the second piece of auxiliary information sent by the T-Box device 1 (hereinafter referred to as the "fifth receiving apparatus," not shown); and an apparatus configured for detecting whether a first trigger condition for data integrity is satisfied based on the first piece of auxiliary information and the second piece of auxiliary information (hereinafter referred to as the "first detection apparatus," not shown); wherein the second sending apparatus 22 is configured for:

if the first trigger condition is satisfied, performing a timestamp verification based on time information of receiving the first piece of auxiliary information and the second piece of auxiliary information; and if the verification passes, generating the second piece of information, according to the first piece of information, the hash value of the master key, and the second random number generated by the ECU device 2, and sending the second piece of information to the T-Box device 1.

Specifically, the fifth sending apparatus of the T-Box device 1 sends the first piece of auxiliary information and the second piece of auxiliary information to the ECU device 2. For example, the fifth sending apparatus obtains the first piece of auxiliary information such as M_1: |T_BOX_I-D|ECU-i|T_BOX_1|N_1| by directly data-splicing the identity information of the T-BOX device 1 (T_BOX_ID), the identity information of the ECU device 2 to be communicated (ECU-i), the current system time of the T-BOX device 1 (T_BOX_1), and the first piece of information N_1 generated by the first sending apparatus 11. Then, the first piece of auxiliary information M_1 is summary-calculated using the master key a to obtain the second piece of auxiliary information, such as M_2; then, the fifth sending apparatus sends M_1 and M_2 to the ECU device 2.

Correspondingly, the fifth receiving apparatus of the ECU device 2 receives the first piece of auxiliary information and the second piece of auxiliary information sent by the T-BOX device 1.

Then, the first detection apparatus detects whether the first trigger condition for data integrity is satisfied based on the first piece of auxiliary information and the second piece of auxiliary information, for example, by performing summary-calculation on M_1 using the master key a, and comparing the calculation result with M_2. If they are the same, it indicates that the first trigger condition is satisfied, otherwise, the first trigger condition is not satisfied.

Then, if the first trigger condition is satisfied, the second sending apparatus 22 first performs a timestamp verification based on the time information of receiving the first piece of auxiliary information and the second piece of auxiliary information; and if the verification passes, the second sending apparatus 22 generates the second piece of information according to the first piece of information, the hash value of the master key, and the second random number generated by the ECU device 2, and sends the second piece of information to the T-Box device 1.

For example, assuming that the first detection apparatus detects that the first trigger condition is satisfied, the second sending apparatus 22 first performs a timestamp verification based on the time information of receiving the first piece of auxiliary information and the second piece of auxiliary information. For example, assuming that the time information of receiving, by the fifth receiving apparatus, the first piece of auxiliary information and the second piece of auxiliary information sent by the T-Box device 1 is T_ECU_1, the second sending apparatus 22 sends the first piece of auxiliary information and the second piece of auxiliary information received at the time point to the T-Box device 1 according to the time information, for the T-Box device 1 to check correctness. If the confirmation result returned by the T-Box device 1 is correct, the verification passes; if the confirmation result returned by the T-Box device 1 is incorrect, the verification fails, that is, at this time, a replay attack threat is suffered, and the ECU device 2 may discard the data packet without processing. Only when the verification passes, the second sending apparatus 22 generates the second piece of information and sends the second piece of information to the T-Box device 1.

Here, the present disclosure further improves the security of the communication between the T-Box device 1 and the ECU device 2 by adding the data integrity detection and the timestamp verification at the ECU device 2, and facilitates the detection of attacks and threats.

In another embodiment (referring to FIG. 1), the ECU device 2 further includes an apparatus configured for sending a third piece of auxiliary information and a fourth piece of auxiliary information to the T-Box device 1 (hereinafter referred to as the "sixth sending apparatus," not shown). The T-Box device 1 further includes: an apparatus configured for receiving the third piece of auxiliary information and the fourth piece of auxiliary information sent by the ECU device 2 (hereinafter referred to as the "sixth receiving apparatus," not shown); and an apparatus configured for detecting whether a second trigger condition for data integrity is satisfied (hereinafter referred to as the "second detection apparatus," not shown) according to the third piece of auxiliary information and the fourth piece of auxiliary information; wherein the third sending apparatus 13 is configured for:

if the second trigger condition is satisfied, performing a timestamp verification based on time information of receiving the third piece of auxiliary information and the fourth piece of auxiliary information; and if the verification passes, generating the third piece of information, according to the second piece of information, and sending the third piece of information to the ECU device 2.

Specifically, the sixth sending apparatus of the ECU device 2 sends the third piece of auxiliary information and the fourth piece of auxiliary information to the T-Box device 1. For example, the sixth sending apparatus obtains the third piece of auxiliary information such as M_3: |T_BOX_I-D|ECU-i|T_ECU_2|N_2| by directly data-splicing the identity information of the T-BOX device 1 (T_BOX_ID), the identity information of the ECU device 2 (ECU-i), the current system time of the ECU device 2 (T_ECU_2), and the second piece of information N_2 generated by the second sending apparatus 22. Then, the third piece of auxiliary information M_3 is summary-calculated using the master key a to obtain the fourth piece of auxiliary information, such as M_4; then, the sixth sending apparatus sends M_3 and M_4 to the T-Box device 1.

Correspondingly, the sixth receiving apparatus of the T-Box device 1 receives the third piece of auxiliary information and the fourth piece of auxiliary information sent by the ECU device 2.

Then, the second detection apparatus detects whether the second trigger condition for data integrity is satisfied according to the third piece of auxiliary information and the fourth piece of auxiliary information, for example, by performing summary-calculation on M_3 using the master key a, and comparing the calculation result with M_4. If they are the same, it indicates that the second trigger condition is satisfied, otherwise, the second trigger condition is not satisfied.

Then, if the second trigger condition is satisfied, the third sending apparatus 13 first performs the timestamp verification based on time information of receiving the third piece of auxiliary information and the fourth piece of auxiliary information; and if the verification passes, generates the third piece of information according to the second piece of information, and sends the third piece of information to the ECU device 2.

For example, assuming that the second detection apparatus detects that the second trigger condition is satisfied, the third sending apparatus 13 first performs the timestamp verification based on time information of receiving the third piece of auxiliary information and the fourth piece of auxiliary information. Assuming that the time information of receiving, by the sixth receiving apparatus, the third piece of auxiliary information and the fourth piece of auxiliary information sent by the ECU device 2 is T_BOX_2, the third sending apparatus 13 sends the third piece of auxiliary information and the fourth piece of auxiliary information received at the time point to the ECU device 2 according to the time information, for the ECU device 2 to check correctness. If the confirmation result returned by the ECU device 2 is correct, the verification passes, and if the confirmation result returned by the ECU device 2 is incorrect, the verification fails, that is, at this time, a replay attack threat is suffered, and the T-Box device 1 may discard the data packet without processing. Only when the verification passes, the third sending apparatus 13 generates the third piece of information and sends the third piece of information to the ECU device 2.

Here, the present disclosure further improves the security of the communication between the T-Box device 1 and the ECU device 2 by adding the data integrity detection and the timestamp verification at the T-Box device 1, and facilitates the detection of attacks and threats.

In yet another embodiment (referring to FIG. 1), the fourth sending apparatus 15 of the T-Box device 1 is further configured for sending a fifth piece of auxiliary information and a sixth piece of auxiliary information to the ECU device 2. The ECU device 2 further includes: an apparatus configured for receiving the fifth piece of auxiliary information and the sixth piece of auxiliary information sent by the T-Box device 1 (hereinafter referred to as the "seventh receiving apparatus," not shown); and an apparatus configured for performing a timestamp verification based on time information of receiving the fifth piece of auxiliary information and the sixth piece of auxiliary information (hereinafter referred to as the "first verification apparatus," not shown).

Here, the second key apparatus 25 is configured for:

if the verification passes, generating the second key, according to the third piece of information and the second random number, and the identity information of the T-Box device and the identity of the ECU device, in response to receiving the instruction sent by the T-Box device.

Specifically, the fourth sending apparatus 15 of the T-Box device 1 is further configured for sending the fifth piece of auxiliary information and the sixth piece of auxiliary information to the ECU device 2. For example, the fourth sending apparatus 15 obtains the fifth piece of auxiliary information M_5: |T_BOX_ID|ECU-i|T_BOX_3|N_3|key_1_Instruction-1| by data-splicing the encrypted instruction (key_1_Instruction-1), the identity information of the ECU device 2 (ECU-i), the third random number N_3, and the current system time of the T-BOX device 1 (T_BOX_3); then, performs summary-calculation on M_5 using the first key key_1 to obtain M_6, and sends M_5 and M_6 to the ECU device 2.

Correspondingly, the seventh receiving apparatus of the ECU device 2 receives the fifth piece of auxiliary information and the sixth piece of auxiliary information sent by the T-BOX device 1.

Then, the first verification apparatus performs the timestamp verification based on the time information of receiving the fifth piece of auxiliary information and the sixth piece of auxiliary information. For example, assuming that the time information of receiving, by the seventh receiving apparatus, the fifth piece of auxiliary information and the sixth piece of auxiliary information sent by the T-Box device 1 is T_ECU_3, the first verification apparatus performs the timestamp verification based on the time information of receiving the fifth piece of auxiliary information and the sixth piece of auxiliary information, and sends the fifth piece of auxiliary information and the sixth piece of auxiliary information received at the time point to the T-Box device 1, for the T-Box device 1 to check correctness. If the confirmation result returned by the T-Box device 1 is correct, the verification passes, and if the confirmation result returned by the T-Box device 1 is incorrect, the verification fails, that is, at this time, a replay attack threat is suffered, and the ECU device 2 may discard the data packet without processing.

If the verification passes, the second key apparatus 25 generates the second key, according to the third piece of information and the second random number, and the identity information of the T-Box device and the identity of the ECU device, in response to receiving the instruction sent by the T-Box device.

Here, the present disclosure further improves the security of the communication between the T-Box device 1 and the ECU device 2 by adding the timestamp verification at the ECU device 2, and facilitates the detection of attacks and threats.

In still another embodiment (referring to FIG. 1), after obtaining the instruction, the ECU device 2 further includes: an apparatus configured for detecting whether a fourth trigger condition for deleting the second key and the second random number is satisfied (hereinafter referred to as the "third detection apparatus," not shown); and if the fourth trigger condition is not satisfied, an apparatus configured for encrypting return data based on the second key to send the encrypted return data to the T-Box device 1 (hereinafter referred to as the "eighth sending apparatus," not shown). The T-Box device 1 further includes: an apparatus configured for receiving the encrypted return data sent by the ECU device 2 (hereinafter referred to as the "eighth receiving apparatus," not shown), wherein the return data is encrypted by the second key; and an apparatus configured for decrypting the received, encrypted return data based on the first key to obtain the return data (hereinafter referred to as the "second decryption apparatus," not shown).

Specifically, after obtaining the instruction, the ECU device 2 starts to execute a corresponding operation, and if the data does not need to be returned to the T-Box device 1 or there is no instruction issued within a certain time period after the instruction is executed, the third detection apparatus may determine that the fourth trigger condition is satisfied, and key_2 and the second random number nounce_2 are deleted.

If the fourth trigger condition is not satisfied, the eighth sending apparatus encrypts the return data based on the second key to send the encrypted return data to the T-Box device 1. For example, if the data needs to be returned to the T-Box device 1, the eighth sending apparatus encrypts the return data by using key_2 to send the encrypted return data to the T-Box device 1.

Correspondingly, the eighth receiving apparatus of the T-Box device 1 receives the encrypted return data sent by the ECU device 2.

The second decryption apparatus decrypts the received, encrypted return data based on the first key key_1 to obtain the return data.

Preferably, after the T-Box device 1 obtains the return data, if there is no instruction sent to the ECU device 2 continuously, the T-Box device 1 further includes an apparatus configured for deleting the first key, the first random number and the third random number (hereinafter referred to as the "deletion apparatus," not shown).

For example, after the T-Box device 1 obtains the return data, if there is no instruction sent to the ECU device 2 continuously, the deletion apparatus deletes the first key key_1, the first random number nounce_1 and the third random number nounce_3.

Preferably, the eighth sending apparatus is further configured for sending a seventh piece of auxiliary information and an eighth piece of auxiliary information to the T-Box device 1; wherein the eighth receiving apparatus of the T-Box device 1 is further configured for receiving the seventh piece of auxiliary information and the eighth piece of auxiliary information sent by the ECU device 2, wherein the second decryption apparatus is configured for:

performing a timestamp verification based on time information of receiving the seventh piece of auxiliary information and the eighth piece of auxiliary information; and if the verification passes, detecting whether a fifth trigger condition for data integrity is satisfied according to the first key, the seventh piece of auxiliary information and the eighth piece of auxiliary information; and if the fifth trigger condition is satisfied, decrypting the received, encrypted return data based on the first key to obtain the return data.

Specifically, after the ECU device 2 obtains the instruction, if the fourth trigger condition is not satisfied, and if the data is needed to be returned to the T-Box device 1, the eighth sending apparatus first directly data-splices the encrypted return data, the identity information of the ECU device 2 (ECU-i), and the current system time of the ECU device 2 (T_ECU_4) to obtain the seventh piece of auxiliary information M_7, and performs summary-calculation on M_7 using the second key key_2 to obtain the eighth piece of auxiliary information M_8, and sends M_7 and M_8 to the T-Box device 1.

Correspondingly, the eighth receiving apparatus of the T-Box device 1 is further configured for receiving the seventh piece of auxiliary information and the eighth piece of auxiliary information sent by the ECU device 2.

Then, the second decryption apparatus of the T-Box device 1 first performs the timestamp verification based on the time information of receiving the seventh piece of auxiliary information and the eighth piece of auxiliary information. Here, the timestamp verification method is the same or similar to the foregoing timestamp verification method, and for brevity, detailed description thereof is omitted. If the verification passes, the second decryption apparatus detects again whether the fifth trigger condition for data integrity is satisfied according to the first key, the seventh piece of auxiliary information and the eighth piece of auxiliary information, such as by performing summary-calculation on M_7 using the first key key_1 and comparing the calculation result with M_8. If the calculation result is identical to M_8, it indicates that the fifth trigger condition is satisfied, otherwise, the fifth trigger condition is not satisfied. If the fifth trigger condition is satisfied, the second decryption apparatus decrypts the received, encrypted return data based on the first key key_1 to obtain the return data.

Figure 2:
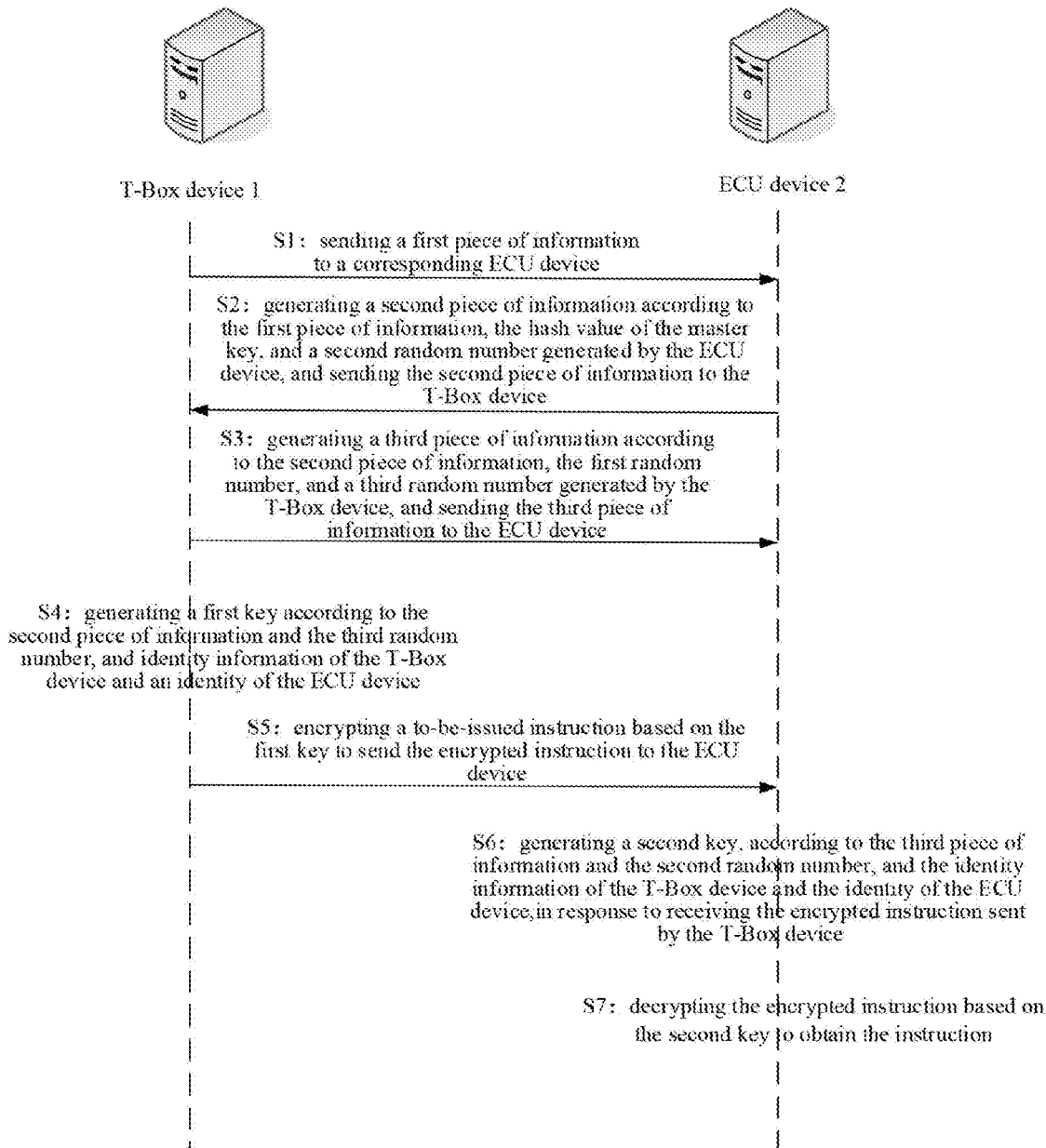
FIG. 2 shows a flowchart of a method for communicating securely between a T-Box device and an ECU device in an Internet of Vehicles system according to another aspect of the present disclosure.

FIG. 2 shows a flowchart of a method for communicating securely between a T-Box device and an ECU device in an Internet of Vehicles system according to another aspect of the present disclosure.

Here, the method includes step S1, step S2, step S3, step S4, step S5, step S6 and step S7.

Specifically, in step S1, a T-Box device 1 sends a first piece of information to a corresponding ECU device 2, wherein the first piece of information is obtained by XORing a first random number generated by the T-Box device 1 with the hash value of the master key of the Internet of Vehicles system; correspondingly, the ECU device 2 receives the first piece of information sent by the corresponding T-Box device 1, wherein the first piece of information is obtained by XORing the first random number generated by the T-Box device 1 with the hash value of the master key of the Internet of Vehicles system; in step S2, the ECU device 2 generates a second piece of information according to the first piece of information, the hash value of the master key, and a second random number generated by the ECU device 2, and sends the second piece of information to the T-Box device 1; correspondingly, the T-Box device 1 receives the second piece of information sent by the ECU device 2, wherein the second piece of information is generated according to the first piece of information, the hash value of the master key, and the second random number generated by the ECU device 2; in step S3, the T-Box device 1 generates a third piece of information according to the second piece of information, the first random number, and a third random number generated by the T-Box device 1, and sends the third piece of information to the ECU device 2; correspondingly, the ECU device 2 receives the third piece of information sent by the T-Box device 1; in step S4, the T-Box device 1 generates a first key according to the second piece of information and the third random number, and identity information of the T-Box device 1 and an identity of the ECU device 2; in step S5, the T-Box device 1 encrypts the to-be-issued instruction based on the first key to send the encrypted instruction to the ECU device 2; correspondingly, the ECU device 2 receives the encrypted instruction sent by the T-Box device 1, wherein the instruction is encrypted by the first key, and the generation of the first key is based on the second piece of information, the third random number generated by the T-Box device 1, and the identity information of the T-Box device 1 and the identity of the ECU device 2; in step S6, the ECU device 2 generates a second key according to the third piece of information and the second random number, and the identity information of the T-Box device 1 and the identity of the ECU device 2, in response to receiving the encrypted instruction; and in step S7, the ECU device 2 decrypts the encrypted instruction based on the second key to obtain the instruction.

Here, the T-Box device 1 refers to a vehicle-mounted information terminal in the vehicle mainly used for communicating with a backend system/mobile phone APP to implement the display and control of the vehicle information of the mobile phone APP. For example, the management to the operation data and position data of the vehicle is implemented, functions such as real-time monitoring (maps, charts), data playback, track playback, remote diagnosis are provided, and data information of the in-vehicle ECU device and the exterior of the vehicle can be exchanged.

Here, the ECU device 2 refers to a dedicated microcomputer controller of the vehicle and is generally composed of a microprocessor (CPU), a memory (ROM, RAM), an input/output interface (I/O), an analog/digital converter (A/D) and large-scale integrated circuits such as those for shaping and driving, which may be referred to as a "driving computer," a "vehicle-mounted computer" and so on.

Here, before the vehicle leaves the factory, the T-Box device 1 and the ECU device 2 may be pre-assigned identity information, including the identity ID of the T-Box device 1 (e.g., the T_BOX_ID), the identity ID of the ECU devices 2 (e.g., the ECU-i), and the master key for the network communication between the T-Box device 1 and the ECU device 2. In a specific embodiment, the T-Box device 1 and the ECU device 2 may communicate using a CAN bus. Here, the master key refers to a key shared between the T-Box device 1 and the ECU device 2 as an initial auxiliary key for generating a session key between the T-Box device 1 and the ECU device 2, and the master Key can be synchronized within a certain period.

Those skilled in the art should understand that the above-mentioned T-Box device 1 and the ECU device 2 are only examples, and other T-Box devices or ECU devices that exists or may appear in the future should also be included in the protection scope of the present disclosure, if applicable to the present disclosure, and hereby incorporated by reference herein. Here, each of the T-Box device 1 and the ECU device 2 includes an electronic device capable of automatically performing numerical calculation and information processing according to instructions preset or stored in advance. The hardware includes, but is not limited to, a microprocessor, a dedicated integrated circuit (ASIC), a field programmable gate array (FPGA), a digital signal processor (DSP), an embedded device, and the like.

Specifically, in step S1, the T-Box device 1 sends the first piece of information to the corresponding ECU device 2, wherein the first piece of information is obtained by XORing the first random number generated by the T-Box device 1 with the hash value of the master key of the Internet of Vehicles system.

For example, the T-Box device 1 and the ECU device 2 of a newly minted vehicle are pre-assigned identity information, for example, the identity ID of the T-Box device 1 is T_BOX_ID, the identity ID of the ECU devices 2 is ECU-i, and the master key for the network communication between the T-Box device 1 and the ECU device 2 is a. When the T-Box device 1 communicates with the ECU device 2, in step S1, the T-Box device 1 first generates the first random number such as nounce_1, and then XORs the first random number with the hash value of the master key a to obtain the first piece of information, that is, if the first piece of information is denoted by N_1, N_1=nounce_1⊕hash (a). Then, the T-Box device 1 sends the first piece of information to the corresponding ECU device 2 via the CAN bus.

Correspondingly, the ECU device 2 receives the first piece of information sent by the corresponding T-Box device 1 via the CAN bus, wherein the first piece of information is obtained by XORing the first random number generated by the T-Box device 1 with the hash value of the master key of the Internet of Vehicles system. For example, following the above example, in step S1, the first piece of information received by the ECU device 2 is N_1.

In step S2, the ECU device 2 generates the second piece of information according to the first piece of information, the hash value of the master key, and the second random number generated by the ECU device 2, and sends the second piece of information to the T-Box device 1.

For example, following the above example, in step S2, the ECU device 2 first generates the second random number such as nounce_2, then, XORs the first piece of information N_1 with the hash value hash (a) of the master key to obtain nounce_1_cal, and XORS this XORed value nounce_1_cal with the second random number nounce_2 to obtain the second piece of information, that is, if the second piece of information is denoted by N_2, N_2=nounce_2⊕nounce_1_cal=nounce_2⊕[N_1⊕hash (a)]. Then, in step S2, the ECU device 2 sends the second piece of information to the T-Box device 1 via the CAN bus.

Correspondingly, the T-Box device 1 receives the second piece of information sent by the ECU device 2, wherein the second piece of information is generated according to the first piece of information, the hash value of the master key, and the second random number generated by the ECU device 2. For example, in step S2, the T-Box device 1 receives the second piece of information N_2 sent by the ECU device 2 via the CAN bus.

In step S3, the T-Box device 1 generates the third piece of information according to the second piece of information, the first random number, and the third random number generated by the T-Box device 1, and sends the third piece of information to the ECU device 2.

For example, in step S3, the T-Box device 1 calculates the XORed value of the second piece of information N_2 and the first random number nounce_1 to obtain nounce_2_cal, and XORs nounce_2_cal with the generated third random number nounce_3 to obtain the third piece of information N_3, that is, N_3=nounce_3⊕nounce_2_cal=nounce_3⊕[N_2_nounce_1]. Then, in step S3, the T-Box device 1 sends the third piece of information to the ECU device 2 via the CAN bus.

Correspondingly, the ECU device 2 receives the third piece of information N_3 sent by the T-Box device 1 via the CAN bus.

In step S4, the T-Box device 1 generates the first key according to the second piece of information and the third random number, and the identity information of the T-Box device 1 and the identity of the ECU device 2. For example, in step S4, the T-Box device 1 first data-splices the identity information of the T-Box device 1 T_BOX_ID, the identity of the ECU device 2 that is currently in communicating with the T-Box device 1 ECU-i, the third random number nounce_3, and the nounce_2_cal by data splicing to obtain: |T_BOX_ID|ECU-i|nounce_3|nounce_2_cal|. Then, a hash operation is performed on the result of the splicing by using the hash algorithm MD5 to obtain the first key key_1.

In step S5, the T-Box device 1 encrypts the to-be-issued instruction based on the first key to send the encrypted instruction to the ECU device 2. For example, assuming that the to-be-issued instruction is Instruction-1, in step S5, the T-Box device 1 first encrypts the instruction using key_1 to obtain the encrypted instruction key_1_Instruction-1. Then, the encrypted instruction key_1_Instruction-1 is sent to the ECU device 2 via the CAN bus.

Correspondingly, the ECU device 2 receives the encrypted instruction sent by the T-Box device 1 via the CAN bus, wherein the instruction is encrypted by the first key, and the generation of the first key is based on the second piece of information, the third random number generated by the T-Box device 1, and the identity information of the T-Box device 1 and the identity of the ECU device 2.

In step S6, the ECU device 2 generates the second key according to the third piece of information and the second random number, and the identity information of the T-Box device 1 and the identity of the ECU device 2, in response to receiving the encrypted instruction. For example, after the ECU device 2 receives the encrypted instruction key_1_Instruction-1 from the T-Box device 1 in step S5, in step S6, the ECU device 2 first data-splices the identity information of the T-Box device 1 That is currently in communicating with the ECU device 2 T_BOX_ID, the identity of the ECU device 2 ECU-i, the XORed value of the third piece of information and the second random number nounce_3_cal=N_3⊕nounce_2, and the second random number nounce_2 by data splicing to obtain: |T_BOX_ID|ECU-i|nounce_3_cal|nounce_2|. Then, a hash operation is performed on the result of the splicing by using the hash algorithm MD5 to obtain the second key key_2.

In step S7, the ECU device 2 decrypts the encrypted instruction based on the second key to obtain the instruction. For example, in step S7, the ECU device 2 decrypts the encrypted instruction key_1_Instruction-1 by using key_2 to obtain the corresponding instruction.

Here, the T-Box device in the present disclosure is capable of performing lightweight, secure communication with the ECU device using the negotiated secure session key. Specifically, the key negotiation parameter uses fixed parameters of the T-Box and the ECU themselves, random numbers generated by the T-Box and the ECU themselves to obtain a final, uniformed negotiation parameter through three interaction calculations, and then uses the secure hash function to act on the final negotiation parameter. In this process, the bidirectional authentication of the identity and the generation of the session key are completed. Finally, the session key is used to complete the subsequent data communication process.

Here, the T-Box device in the present disclosure is capable of performing lightweight, secure communication with the ECU device using the negotiated secure session key, which solves the threat in the development of the present Internet of Vehicles that the user control command is eavesdropped, intercepted, forged and replayed in the "last kilometer," also enables the bidirectional authentication between the T-Box device and the ECU device, and further reduces the risk that either device is maliciously captured and thus sends unlawful data, such as an illegal ECU node sending unreasonable vehicle status information to the user, the captured T-Box device being maliciously replaced and used to execute hacker instructions to the in-vehicle network.

The operation between the various steps of the T-Box device 1 and the ECU device 2 is continuous. Specifically, in step S1, the T-Box device 1 continuously sends the first piece of information to the corresponding ECU device 2, wherein the first piece of information is obtained by XORing the first random number generated by the T-Box device 1 with the hash value of the master key of the Internet of Vehicles system; correspondingly, the ECU device 2 continuously receives the first piece of information sent by the corresponding T-Box device 1, wherein the first piece of information is obtained by XORing the first random number generated by the T-Box device 1 with the hash value of the master key of the Internet of Vehicles system; in step S2, the ECU device 2 continuously generates the second piece of information according to the first piece of information, the hash value of the master key, and the second random number generated by the ECU device 2, and sends the second piece of information to the T-Box device 1; correspondingly, the T-Box device 1 continuously receives the second piece of information sent by the ECU device 2, wherein the second piece of information is generated according to the first piece of information, the hash value of the master key, and the second random number generated by the ECU device 2; in step S3, the T-Box device 1 continuously generates the third piece of information according to the second piece of information, the first random number, and the third random number generated by the T-Box device 1, and sends the third piece of information to the ECU device 2; correspondingly, the ECU device 2 continuously receives the third piece of information sent by the T-Box device 1; in step S4, the T-Box device 1 continuously generates the first key according to the second piece of information and the third random number, and the identity information of the T-Box device 1 and the identity of the ECU device 2; in step S5, the T-Box device 1 continuously encrypts the to-be-issued instruction based on the first key to send the encrypted instruction to the ECU device 2; correspondingly, the ECU device 2 continuously receives the encrypted instruction sent by the T-Box device 1, wherein the instruction is encrypted by the first key, and the generation of the first key is based on the second piece of information, the third random number generated by the T-Box device 1, and the identity information of the T-Box device 1 and the identity of the ECU device 2; in step S6, the ECU device 2 continuously generates the second key according to the third piece of information and the second random number, and the identity information of the T-Box device 1 and the identity of the ECU device 2, in response to receiving the encrypted instruction; and in step S7, the ECU device 2 continuously decrypts the encrypted instruction based on the second key to obtain the instruction. Here, it should be understood by those skilled in the art that the "continuously" means that the generation and sending of the first piece of information, the generation and sending of the second piece of information, the generation and sending of the third piece of information, the generation of the first key, the sending of the instruction encrypted by the first key, the generation of the second key, and the decryption of the instruction are continuously performed between the steps of the T-Box device 1 and the ECU device 2, respectively, until the T-Box device 1 stops generating the first piece of information for a relatively long time.

In an embodiment, the method further includes step S8 (not shown). Specifically, in step S8, the T-Box device 1 updates the master key.

For example, in step S8, the T-Box device 1 may update the master key based on the received, user-initiated master key update instruction, or automatically update the master key in a periodic manner or the like.

In a specific embodiment, in step S8, the T-Box device 1 may further issue the updated master key to the ECU device 2, and the process of issuing may be completed according to the process of issuing the instruction between the T-Box device 1 and the ECU device 2. If the update is successfully completed, the original master key is deleted, and then the new master key is used in communication; if the update fails, the master key is not updated, and the user is notified of the failure.

In an embodiment (referring to FIG. 2), the method further includes step S9 (not shown) and step S10 (not shown). Specifically, in step S9, the T-Box device 1 sends a first piece of auxiliary information and a second piece of auxiliary information to the ECU device 2; correspondingly, the ECU device 2 receives the first piece of auxiliary information and the second piece of auxiliary information sent by the T-Box device 1; in step S10, the ECU device 2 detects whether a first trigger condition for data integrity is satisfied based on the first piece of auxiliary information and the second piece of auxiliary information; wherein, in step S2, the ECU device 2 is configured for:
- if the first trigger condition is satisfied, performing a timestamp verification based on time information of receiving the first piece of auxiliary information and the second piece of auxiliary information; and
- if the verification passes, generating the second piece of information, according to the first piece of information, the hash value of the master key, and the second random number generated by the ECU device 2, and sending the second piece of information to the T-Box device 1.

Specifically, in step S9, the T-Box device 1 sends the first piece of auxiliary information and the second piece of auxiliary information to the ECU device 2. For example, in step S9, the T-Box device 1 obtains the first piece of auxiliary information such as M_1: |T_BOX_ID|ECU-i|T_BOX_1|N_1| by directly data-splicing the identity information of the T-BOX device 1 (T_BOX_ID), the identity information of the ECU device 2 to be communicated (ECU-i), the current system time of the T-BOX device 1 (T_BOX_1), and the first piece of information N_1 generated by the T-Box device 1 in step S1, then, summary-calculates the first piece of auxiliary information M_1 using the master key a to obtain the second piece of auxiliary information, such as M_2; and then, sends M_1 and M_2 to the ECU device 2.

Correspondingly, the ECU device 2 receives the first piece of auxiliary information and the second piece of auxiliary information sent by the T-BOX device 1.

Then, in step S10, the ECU device 2 detects whether the first trigger condition for data integrity is satisfied based on the first piece of auxiliary information and the second piece of auxiliary information, for example, by performing summary-calculation on M_1 using the master key a, and comparing the calculation result with M_2. If they are the same, it indicates that the first trigger condition is satisfied, otherwise, the first trigger condition is not satisfied.

Then, if the first trigger condition is satisfied, in step S2, the ECU device 2 first performs the timestamp verification based on the time information of receiving the first piece of auxiliary information and the second piece of auxiliary information; and if the verification passes, in step S2, the ECU device 2 generates the second piece of information according to the first piece of information, the hash value of the master key, and the second random number generated by the ECU device 2, and sends the second piece of information to the T-Box device 1.

For example, assuming that in step S10, the ECU device 2 detects that the first trigger condition is satisfied, in step S2, the ECU device 2 first performs the timestamp verification based on the time information of receiving the first piece of auxiliary information and the second piece of auxiliary information. For example, assuming that in step S9, the time information of receiving, by the ECU device 2, the first piece of auxiliary information and the second piece of auxiliary information sent by the T-Box device 1 is T_ECU_1, in step S2, the ECU device 2 sends the first piece of auxiliary information and the second piece of auxiliary information received at the time point to the T-Box device 1 according to the time information, for the T-Box device 1 to check correctness. If the confirmation result returned by the T-Box device 1 is correct, the verification passes, and if the confirmation result returned by the T-Box device 1 is incorrect, the verification fails, that is, at this time, a replay attack threat is suffered, and the ECU device 2 may discard the data packet without processing. Only when the verification passes, in step S2, the ECU device 2 generates the second piece of information and sends the second piece of information to the T-Box device 1.

Here, the present disclosure further improves the security of the communication between the T-Box device 1 and the ECU device 2 by adding the data integrity detection and the timestamp verification at the ECU device 2, and facilitates the detection of attacks and threats.

In another embodiment (referring to FIG. 2), wherein the method further includes step S11 (not shown) and step S12 (not shown). Specifically, in step S11, the ECU device 2 sends a third piece of auxiliary information and a fourth piece of auxiliary information to the T-Box device 1; correspondingly, the T-Box device 1 receives the third piece of auxiliary information and the fourth piece of auxiliary information sent by the ECU device 2; and in step S12, the T-Box device 1 detects whether a second trigger condition for data integrity is satisfied according to the third piece of auxiliary information and the fourth piece of auxiliary information; wherein, in step S3, the T-Box device 1 is configured for:

if the second trigger condition is satisfied, performing a timestamp verification based on time information of receiving the third piece of auxiliary information and the fourth piece of auxiliary information; and if the verification passes, generating the third piece of information, according to the second piece of information, and sending the third piece of information to the ECU device 2.

Specifically, in step S11, the ECU device 2 sends the third piece of auxiliary information and the fourth piece of auxiliary information to the T-Box device 1. For example, in step S11, the ECU device 2 obtains the third piece of auxiliary information such as M_3: |T_BOX_ID|ECU-i|T_ECU_2|N_2| by directly data-splicing the identity information of the T-BOX device 1 (T_BOX_ID), the identity information of the ECU device 2 (ECU-i), the current system time of the ECU device 2 (T_ECU_2), and the second piece of information N_2 generated by the ECU device 2 in step S2. Then, the third piece of auxiliary information M_3 is summary-calculated using the master key a to obtain the fourth piece of auxiliary information, such as M_4; then, the ECU device 2 sends M_3 and M_4 to the T-Box device 1.

Correspondingly, the T-Box device 1 receives the third piece of auxiliary information and the fourth piece of auxiliary information sent by the ECU device 2.

Then, in step S12, the T-Box device 1 detects whether the second trigger condition for data integrity is satisfied according to the third piece of auxiliary information and the fourth piece of auxiliary information, for example, by performing summary-calculation on M_3 using the master key a, and comparing the calculation result with M_4. If they are the same, it indicates that the second trigger condition is satisfied, otherwise, the second trigger condition is not satisfied.

If the second trigger condition is satisfied, in step S3, the T-Box device 1 first performs the timestamp verification based on time information of receiving the third piece of auxiliary information and the fourth piece of auxiliary information; and if the verification passes, generates the third piece of information according to the second piece of information, and sends the third piece of information to the ECU device 2.

For example, assuming that in step S12, the T-Box device 1 detects that the second trigger condition is satisfied, in step S3, the T-Box device 1 first performs the timestamp verification based on time information of receiving the third piece of auxiliary information and the fourth piece of auxiliary information. Assuming that in step S12, the time information of receiving, by the T-Box device 1, the third piece of auxiliary information and the fourth piece of auxiliary information sent by the ECU device 2 is T_BOX_2, in step S3, the T-Box device 1 sends the third piece of auxiliary information and the fourth piece of auxiliary information received at the time point to the ECU device 2 according to the time information, for the ECU device 2 to check correctness. If the confirmation result returned by the ECU device 2 is correct, the verification passes, and if the confirmation result returned by the ECU device 2 is incorrect, the verification fails, that is, at this time, a replay attack threat is suffered, and the T-Box device 1 may discard the data packet without processing. Only when the verification passes, in step S3, the T-Box device 1 generates the third piece of information and sends the third piece of information to the ECU device 2.

Here, the present disclosure further improves the security of the communication between the T-Box device 1 and the ECU device 2 by adding the data integrity detection and the timestamp verification at the T-Box device 1, and facilitates the detection of attacks and threats.

In yet another embodiment (referring to FIG. 2), the method further includes step S13 (not shown). Here, in step S5, the T-Box device 1 further sends a fifth piece of auxiliary information and a sixth piece of auxiliary information to the ECU device 2; correspondingly, the ECU device 2 further receives the fifth piece of auxiliary information and the sixth piece of auxiliary information sent by the T-Box device 1; and in step S13, the ECU device 2 performs a timestamp verification based on time information of receiving the fifth piece of auxiliary information and the sixth piece of auxiliary information.

Here, in step S6, the ECU device 2 is configured for:

if the verification passes, generating the second key, according to the third piece of information and the second random number, and the identity information of the T-Box device and the identity of the ECU device, in response to receiving the instruction sent by the T-Box device.

Specifically, in step S5, the T-Box device 1 further sends the fifth piece of auxiliary information and the sixth piece of auxiliary information to the ECU device 2. For example, in step S5, the T-Box device 1 obtains the fifth piece of auxiliary information M_5: |T_BOX_ID|ECU-i|T_BOX_3|N_3/key_1_Instruction-1| by data-splicing the encrypted instruction (key_1_Instruction-1), the identity information of the ECU device 2 (ECU-i), the third random number N_3, and the current system time of the T-BOX device 1 (T_BOX_3); then, performs summary-calculation on M_5 using the first key key_1 to obtain M_6, and sends M_5 and M_6 to the ECU device 2.

Correspondingly, the ECU device 2 receives the fifth piece of auxiliary information and the sixth piece of auxiliary information sent by the T-BOX device 1.

Then, in step S13, the ECU device 2 performs the timestamp verification based on the time information of receiving the fifth piece of auxiliary information and the sixth piece of auxiliary information. For example, assuming that in step S5, the time information of receiving, by the ECU device 2, the fifth piece of auxiliary information and the sixth piece of auxiliary information sent by the T-Box device 1 is T_ECU_3, in step S13, the ECU device 2 performs the timestamp verification based on the time information of receiving the fifth piece of auxiliary information and the sixth piece of auxiliary information, and sends the fifth piece of auxiliary information and the sixth piece of auxiliary information received at the time point to the T-Box device 1, for the T-Box device 1 to check correctness. If the confirmation result returned by the T-Box device 1 is correct, the verification passes, and if the confirmation result returned by the T-Box device 1 is incorrect, the verification fails, that is, at this time, a replay attack threat is suffered, and the ECU device 2 may discard the data packet without processing.

if the verification passes, in step S6, the ECU device 2 generates the second key, according to the third piece of information and the second random number, and the identity information of the T-Box device and the identity of the ECU device, in response to receiving the instruction sent by the T-Box device.

Here, the present disclosure further improves the security of the communication between the T-Box device 1 and the ECU device 2 by adding the timestamp verification at the ECU device 2, and facilitates the detection of attacks and threats.

In still another embodiment (referring to FIG. 2), after the ECU device 2 obtains the instruction, the method further includes step S14 (not shown), step S15 (not shown) and step S16 (not shown). Specifically, in step S14, the ECU device 2 detects whether a fourth trigger condition for deleting the second key and the second random number is satisfied; and if the fourth trigger condition is not satisfied, in step S15, the ECU device 2 encrypts return data according to the second key to send the encrypted return data to the T-Box device 1; correspondingly, the T-Box device 1 receives the encrypted return data sent by the ECU device 2, wherein the return data is encrypted by the second key; in step S16, the T-Box device 1 decrypts the received, encrypted return data based on the first key to obtain the return data.

Specifically, after obtaining the instruction, the ECU device 2 starts to execute a corresponding operation, and if the data does not need to be returned to the T-Box device 1 or there is no instruction issued within a certain time period after the instruction is executed, in step S14, the ECU device 2 may determine that the fourth trigger condition is satisfied, and key_2 and the second random number nounce_2 are deleted.

If the fourth trigger condition is not satisfied, in step S15, the ECU device 2 encrypts the return data based on the second key to send the encrypted return data to the T-Box device 1. For example, if the data needs to be returned to the T-Box device 1, in step S15, the ECU device 2 encrypts the return data using key_2 to send the encrypted return data to the T-Box device 1.

Correspondingly, the T-Box device 1 receives the encrypted return data sent by the ECU device 2.

In step S16, the T-Box device 1 decrypts the received, encrypted return data based on the first key key_1 to obtain the return data.

Preferably, after the T-Box device 1 obtains the return data, if there is no instruction sent to the ECU device 2 continuously, the method further includes step S17 (not shown). Specifically, in step S17, the T-Box device 1 deletes the first key, the first random number and the third random number.

For example, after the T-Box device 1 obtains the return data, if there is no instruction sent to the ECU device 2 continuously, in step S17, the T-Box device 1 deletes the first key key_1, the first random number nounce_1 and the third random number nounce_3.

Preferably, in step S15, the ECU device 2 is further configured for sending a seventh piece of auxiliary information and an eighth piece of auxiliary information to the T-Box device 1; correspondingly, the T-Box device 1 is further configured for receiving the seventh piece of auxiliary information and the eighth piece of auxiliary information sent by the ECU device 2, wherein in step S16, the T-Box device 1 is configured for:

performing a timestamp verification based on time information of receiving the seventh piece of auxiliary information and the eighth piece of auxiliary information; and if the verification passes, detecting whether a fifth trigger condition for data integrity is satisfied according to the first key, the seventh piece of auxiliary information and the eighth piece of auxiliary information; and if the fifth trigger condition is satisfied, decrypting the received, encrypted return data based on the first key to obtain the return data.

Specifically, after the ECU device 2 obtains the instruction, if the fourth trigger condition is not satisfied, and if the data is needed to be returned to the T-Box device 1, in step S15, the ECU device 2 first directly data-splices the encrypted return data, the identity information of the ECU device 2 (ECU-i), and the current system time of the ECU device 2 (T_ECU_4) to obtain the seventh piece of auxiliary information M_7, and performs summary-calculation on M_7 using the second key key_2 to obtain the eighth piece of auxiliary information M_8, and sends M_7 and M_8 to the T-Box device 1.

Correspondingly, the T-Box device 1 receives the seventh piece of auxiliary information and the eighth piece of auxiliary information sent by the ECU device 2.

Then, in step S16, the T-Box device 1 first performs the timestamp verification based on the time information of receiving the seventh piece of auxiliary information and the eighth piece of auxiliary information. Here, the timestamp verification method is the same or similar to the foregoing timestamp verification method, and for brevity, detailed description thereof is omitted. If the verification passes, in step S16, the T-Box device 1 detects again whether the fifth trigger condition for data integrity is satisfied according to the first key, the seventh piece of auxiliary information and the eighth piece of auxiliary information, such as by performing summary-calculation on M_7 using the first key key_1 and comparing the calculation result with M_8. If the calculation result is identical to M_8, it indicates that the fifth trigger condition is satisfied, otherwise, the fifth trigger condition is not satisfied. If the fifth trigger condition is satisfied, in step S16, the T-Box device 1 decrypts the received, encrypted return data based on the first key key_1 to obtain the return data.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various steps or functions.

Further, a portion of the present disclosure may be applied as a computer program product, for example, a computer program instruction, which, when executed by the computer, may invoke or provide a method and/or technical solution according to the present disclosure through operations of the computer. Further, the program instruction invoking the method of the present disclosure may be stored in a fixed or mobile recording medium, and/or transmitted through broadcast or data flow in other signal bearer media, and/or stored in a working memory of a computer device, which operates based on the program instruction. Here, in an embodiment according to the present disclosure, an apparatus comprises a memory for storing a computer program instruction and a processor for executing the program instruction, wherein when the computer program instruction is executed by the processor, the apparatus is triggered to run the methods and/or technical solutions according to a plurality of embodiments of the present disclosure.

To those skilled in the art, it is apparent that the present disclosure is not limited to the details of the above illustrative embodiments, and the present disclosure may be implemented with other forms without departing from the spirit or basic features of the present disclosure. Thus, in any way, the embodiments should be regarded as illustrative, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or apparatuses stated in the apparatus claims may also be implemented by a single unit or apparatus through software or hardware. Terms such as the first and the second are used to indicate names, but do not indicate any particular sequence.

What is claimed is:

1. A method for communicating securely between a Telematics Box (T-Box) device and an Electronic Control Unit (ECU) device in an Internet of Vehicles system, the method comprising:
   sending, by the T-Box device, a first piece of information to the ECU device, the first piece of information being obtained by XORing a first random number generated by the T-Box device with a hash value of a master key of the Internet of vehicles system;
   generating, by the ECU device, a second piece of information according to the first piece of information, the hash value of the master key, and a second random number generated by the ECU device, and sending the second piece of information to the T-Box device;
   generating, by the T-Box device, a third piece of information according to the second piece of information, the first random number, and a third random number generated by the T-Box device, and sending the third piece of information to the ECU device;
   generating, by the T-Box device, a first key according to the second piece of information and the third random number, and identity information of the T-Box device and an identity of the ECU device;
   encrypting, by the T-Box device, an instruction based on the first key to obtain an encrypted instruction, and sending the encrypted instruction to the ECU device;
   generating, by the ECU device, a second key, according to the third piece of information and the second random number, and the identity information of the T-Box device and the identity of the ECU device, in response to receiving the encrypted instruction sent by the T-Box device; and
   decrypting, by the ECU device, the encrypted instruction based on the second key to obtain the instruction.

2. The method according to claim 1, further comprising:
   sending, by the T-Box device, a first piece of auxiliary information and a second piece of auxiliary information to the ECU device; and
   detecting, by the ECU device, whether a first trigger condition for data integrity is satisfied based on the first piece of auxiliary information and the second piece of auxiliary information; and
   the generating, by the ECU device, the second piece of information and sending the second piece of information to the T-Box device comprises:
      if the first trigger condition is satisfied, performing a timestamp verification, by the ECU device, based on time information of receiving the first piece of auxiliary information and the second piece of auxiliary information; and
      if the verification passes, generating the second piece of information, by the ECU device, according to the first piece of information, the hash value of the master key, and the second random number generated by the ECU device, and sending the second piece of information to the T-Box device.

3. The method according to claim 1, further comprising:
   sending, by the ECU device, a third piece of auxiliary information and a fourth piece of auxiliary information to the T-Box device; and
   detecting, by the T-Box device, whether a second trigger condition for data integrity is satisfied according to the third piece of auxiliary information and the fourth piece of auxiliary information; and
   the generating, by the T-Box device, the third piece of information and sending the third piece of information to the ECU device comprises:
      if the second trigger condition is satisfied, performing a timestamp verification, by the T-Box device, based on time information of receiving the third piece of auxiliary information and the fourth piece of auxiliary information; and
      if the verification passes, generating the third piece of information, by the T-Box device, according to the second piece of information, and sending the third piece of information to the ECU device.

4. The method according to claim 1, wherein the encrypting, by the T-Box device, an instruction based on the first key to obtain an encrypted instruction, and sending the encrypted instruction to the ECU device further comprises:
   sending, by the T-Box device, a fifth piece of auxiliary information and a sixth piece of auxiliary information to the ECU device; and
   the method further comprises:
   performing a timestamp verification, by the ECU device, based on time information of receiving the fifth piece of auxiliary information and the sixth piece of auxiliary information; and
   the generating, by the ECU device, a second key, according to the third piece of information and the second random number, and the identity information of the T-Box device and the identity of the ECU device, in response to receiving the encrypted instruction sent by the T-Box device, comprises:
   if the verification passes, generating, by the ECU device, the second key, according to the third piece of information and the second random number, and the identity information of the T-Box device and the identity of the ECU device, in response to receiving the encrypted instruction sent by the T-Box device.

5. The method according to claim 4, wherein the decrypting, by the ECU device, the encrypted instruction based on the second key to obtain the instruction comprises:
   detecting, by the ECU device, whether a third trigger condition for data integrity is satisfied according to the second key, the fifth piece of auxiliary information and the sixth piece of auxiliary information; and if the third trigger condition is satisfied, decrypting, by the ECU device, the encrypted instruction based on the second key to obtain the instruction.

6. The method according to claim 1, wherein after the ECU device obtains the instruction, the method further comprises:
    detecting, by the ECU device, whether a fourth trigger condition for deleting the second key and the second random number is satisfied;
    if the fourth trigger condition is not satisfied, encrypting, by the ECU device, return data based on the second key to send the encrypted return data to the T-Box device; and
    decrypting, by the T-Box device, the received, encrypted return data based on the first key to obtain the return data.

7. The method according to claim 6, wherein after the T-Box device obtains the return data, if there is no instruction continuously sent to the ECU device, the method further comprises:
    deleting, by the T-Box device, the first key, the first random number and the third random number.

8. A non-transitory computer storage medium storing a computer program, the computer program when executed by one or more processors, causes the one or more processors to perform operations, the operations comprise:
    sending, by a Telematics Box (T-Box) device, a first piece of information to an Electronic Control Unit (ECU) device, the first piece of information being obtained by XORing a first random number generated by the T-Box device with a hash value of a master key of an Internet of vehicles system;
    generating, by the ECU device, a second piece of information according to the first piece of information, the hash value of the master key, and a second random number generated by the ECU device, and sending the second piece of information to the T-Box device;
    generating, by the T-Box device, a third piece of information according to the second piece of information, the first random number, and a third random number generated by the T-Box device, and sending the third piece of information to the ECU device;
    generating, by the T-Box device, a first key according to the second piece of information and the third random number, and identity information of the T-Box device and an identity of the ECU device;
    encrypting, by the T-Box device, an instruction based on the first key to obtain an encrypted instruction, and sending the encrypted instruction to the ECU device;
    generating, by the ECU device, a second key, according to the third piece of information and the second random number, and the identity information of the T-Box device and the identity of the ECU device, in response to receiving the encrypted instruction sent by the T-Box device; and
    decrypting, by the ECU device, the encrypted instruction based on the second key to obtain the instruction.

9. A Telematics Box (T-Boxj device for communicating securely with an Electronic Control Unit (ECU) device in an Internet of Vehicles system, the T-Box device comprising:
    at least one processor; and
    a memory storing instructions, the instructions when executed by the at least one processor, cause the at least one processor to perform operations, the operations comprising:
    sending a first piece of information to the ECU device, the first piece of information being obtained by XORing a first random number generated by the T-Box device with a hash value of a master key of the Internet of Vehicles system;
    receiving a second piece of information sent by the ECU device, the second piece of information being generated according to the first piece of information, the hash value of the master key, and a second random number generated by the ECU device;
    generating a third piece of information according to the second piece of information, the first random number, and a third random number generated by the T-Box device, and sending the third piece of information to the ECU device;
    generating a first key according to the second piece of information and the third random number, and identity information of the T-Box device and an identity of the ECU device; and
    encrypting an instruction based on the first key to obtain an encrypted instruction, and sending the encrypted instruction to the ECU device.

10. The T-Box device according to claim 9, wherein the operations further comprise:
    sending a first piece of auxiliary information and a second piece of auxiliary information to the ECU device.

11. The T-Box device according to claim 9, wherein the operations further comprise:
    receiving a third piece of auxiliary information and a fourth piece of auxiliary information sent by the ECU device; and
    detecting whether a second trigger condition for data integrity is satisfied according to the third piece of auxiliary information and the fourth piece of auxiliary information; and
    the generating the third piece of information and sending the third piece of information to the ECU device comprises:
        if the second trigger condition is satisfied, performing a timestamp verification based on time information of receiving the third piece of auxiliary information and the fourth piece of auxiliary information; and
        if the verification passes, generating the third piece of information according to the second piece of information, and sending the third piece of information to the ECU device.

12. The T-Box device according to claim 9, wherein the encrypting a to-be-issued instruction based on the first key to send the encrypted instruction to the ECU device comprises:
    sending a fifth piece of auxiliary information and a sixth piece of auxiliary information to the ECU device.

13. The T-Box device according to claim 9, wherein the operations further comprise:
    receiving encrypted return data sent by the ECU device, the return data is encrypted by a second key; and
    decrypting the received, encrypted return data based on the first key to obtain the return data.

14. The T-Box device according to claim 13, wherein after the T-Box device obtains the return data, if there is no instruction continuously sent to the ECU device, the operations further comprise:
    deleting the first key, the first random number and the third random number.

15. An Electronic Control Unit (ECU) device for communicating securely with a Telematics Box (T-Box) device in an Internet of Vehicles system, the ECU device comprising:
    at least one processor; and a memory storing instructions, the instructions when executed by the at least one processor, cause the at least one processor to perform operations, the operations comprising:

receiving a first piece of information sent by a corresponding the T-Box device, the first piece of information being obtained by XORing a first random number generated by the T-Box device with a hash value of a master key of the Internet of Vehicles system;

generating a second piece of information according to the first piece of information, the hash value of the master key, and a second random number generated by the ECU device, and sending the second piece of information to the T-Box device;

receiving a third piece of information sent by the T-Box device;

receiving encrypted instruction sent by the T-Box device, the encrypted instruction being instruction encrypted by a first key, and the generation of the first key being based on the second piece of information, a third random number generated by the T-Box device, and identity information of the T-Box device and an identity of the ECU device;

generating a second key according to the third piece of information and the second random number, and the identity information of the T-Box device and the identity of the ECU device, in response to receiving the encrypted instruction; and decrypting the encrypted instruction based on the second key to obtain the instruction.

16. The ECU device according to claim 15, wherein the operations further comprise:

receiving a first piece of auxiliary information and a second piece of auxiliary information sent by the T-Box device; and detecting whether a first trigger condition for data integrity is satisfied based on the first piece of auxiliary information and the second piece of auxiliary information; and the generating the second piece of information and sending the second piece of information to the T-Box device comprises:

if the first trigger condition is satisfied, performing a timestamp verification based on time information of receiving the first piece of auxiliary information and the second piece of auxiliary information; and if the verification passes, generating the second piece of information, according to the first piece of information, the hash value of the master key, and the second random number generated by the ECU device, and sending the second piece of information to the T-Box device.

17. The ECU device according to claim 15, wherein the operations further comprise:

sending a third piece of auxiliary information and a fourth piece of auxiliary information to the T-Box device.

18. The ECU device according to claim 15, wherein the operations further comprise:

receiving a fifth piece of auxiliary information and a sixth piece of auxiliary information sent by the T-Box device; and performing a timestamp verification based on time information of receiving the fifth piece of auxiliary information and the sixth piece of auxiliary information; and the generating the second key, in response to receiving the instruction sent by the T-Box device comprises:

if the verification passes, generating the second key, in response to receiving the instruction sent by the T-Box device, according to the third piece of information and the second random number, and the identity information of the T-Box device and the identity of the ECU device.

19. The ECU device according to claim 18, wherein the decrypting the encrypted instruction based on the second key to obtain the instruction comprises:

detecting whether a third trigger condition for data integrity is satisfied according to the second key, the fifth piece of auxiliary information and the sixth piece of auxiliary information; and if the third trigger condition is satisfied, decrypting the encrypted instruction based on the second key to obtain the instruction.

* * * * *